US009175642B2

(12) United States Patent
Surnilla et al.

(10) Patent No.: US 9,175,642 B2
(45) Date of Patent: Nov. 3, 2015

(54) METHOD AND SYSTEM FOR AN INTAKE HUMIDITY SENSOR

(71) Applicant: Ford Global Technologies, LLC, Dearborn, MI (US)

(72) Inventors: Gopichandra Surnilla, West Bloomfield, MI (US); Timothy Joseph Clark, Livonia, MI (US); Evangelos Skoures, Detroit, MI (US); Richard E. Soltis, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 14/034,230

(22) Filed: Sep. 23, 2013

(65) Prior Publication Data

US 2015/0083081 A1 Mar. 26, 2015

(51) Int. Cl.
*F02M 25/07* (2006.01)
*F02M 35/10* (2006.01)

(52) U.S. Cl.
CPC ....... *F02M 25/0704* (2013.01); *F02M 25/0753* (2013.01); *F02M 35/10373* (2013.01); *F02M 2025/0769* (2013.01)

(58) Field of Classification Search
CPC .......... F02M 25/0753; F02M 25/0704; F02M 35/10373; F02M 2025/0769
See application file for complete search history.

(56) References Cited

U.S. PATENT DOCUMENTS

2012/0227714 A1 9/2012 Surnilla et al.
2012/0227719 A1 9/2012 Surnilla et al.

OTHER PUBLICATIONS

Hilditch, James Alfred et al., "Low-Pressure EGR Control During Compressor Bypass Valve Operation," U.S. Appl. No. 13/746,232, filed Jan. 21, 2013, 36 pages.

*Primary Examiner* — Lindsay Low
*Assistant Examiner* — Jacob Amick
(74) *Attorney, Agent, or Firm* — Julia Voutyras; Alleman Hall McCoy Russell & Tuttle LLP

(57) ABSTRACT

Methods and systems are provided for adjusting an engine operating parameter based on an output of a humidity sensor during a compressor bypass valve event. When the compressor bypass valve is closed, a current output of the sensor is used for the adjustments. When the compressor bypass valve is opened, such as to mitigate surge, an output of the sensor stored from before the opening of the bypass valve is used for the adjustments.

16 Claims, 4 Drawing Sheets

METHOD AND SYSTEM FOR AN INTAKE HUMIDITY SENSOR

FIELD

The present application relates to control of a humidity sensor in a boosted vehicle engine system during compressor bypass valve events.

BACKGROUND AND SUMMARY

Engine systems may be configured with exhaust gas recirculation (EGR) systems via which at least a portion of the exhaust gas is recirculated to the engine intake. Various sensors may be coupled in the engine system to estimate the amount of EGR being delivered to the engine. These may include, for example, various temperature, pressure, oxygen, and humidity sensors coupled to the engine intake manifold and/or the exhaust manifold.

One example of a boosted engine system having an intake humidity sensor is shown by Surnilla et al. in US application 2012/0227714. Therein, the humidity sensor is used to infer an ambient humidity. An engine controller may then adjust one or more engine operating parameters, such as fuel injection, valve timing, EGR, etc., based on the estimated ambient humidity.

However, the inventors herein have identified potential issues with such an approach. As an example, during boosted engine operation, any opening of a compressor bypass valve (such as to mitigate or reduce compressor surge) can confound the humidity sensor output. Specifically, opening of the compressor bypass valve may create a (temporary) backflow of air from the charge air cooler outlet location to the compressor inlet location. The back-flowing air may temporarily raise the compressor inlet pressure for a short duration until the boost pressure is sufficiently reduced. The short duration of the increase in pressure at the compressor inlet can cause the air to flow back through an intake air filter to the atmosphere. The intake humidity sensor located between the air filter and the compressor inlet (or at the air filter) will see this back-flowing air. If low pressure EGR was already flowing when the compressor bypass valve was opened, the back-flowing air may have a higher water content (over and above the ambient humidity) due to the presence of EGR. As a result, ambient humidity may be over-estimated by the humidity sensor. As such, this may corrupt the adjustment of the various engine operating parameters while degrading engine performance.

In one example, the above issue may be at least partly addressed by a method for an engine comprising: in response to opening of a compressor bypass valve while EGR is enabled, adjusting an engine operating parameter based on an output of an intake humidity sensor read before the opening of the bypass valve. In this way, a more reliable ambient humidity estimate may be used for engine adjustments.

As an example, during un-boosted engine operating conditions, as well as selected boosted conditions where a compressor bypass valve is not open (such as when the engine is operating within a surge margin), a current output of an intake humidity sensor may be stored and used to estimate an ambient humidity. Further, the current output may be used to adjust one or more engine parameters, such as a spark timing (or spark correction), condensation modeling, an EGR flow rate, humidity sensor diagnostics, etc. Then, during boosted conditions where the compressor bypass valve is opened, such as when the engine is operating at or beyond a surge margin, the current output of the humidity sensor may not be used. Instead, an output of the sensor read immediately before the opening of the bypass valve may be stored and used to estimate the ambient humidity. Further, the various engine operating parameters may be adjusted based on the stored humidity sensor output. After a threshold duration has elapsed since the completion of the compressor bypass valve event (that is, after a threshold duration since the compressor bypass valve has been closed), the current output of the humidity sensor may be re-used to estimate ambient humidity and adjust engine operating parameters.

In this way, a false reading of the humidity sensor is avoided. Specifically, the output of a humidity sensor may not be used during conditions when the output may be corrupted. By disabling use of a current output of the intake humidity sensor during conditions when a compressor bypass valve is open and backflow is increased, humidity overestimation due to EGR flow can be reduced. By freezing the humidity sensor output from before (e.g., immediately before) the compressor bypass event, and using the frozen sensor output to adjust engine operation, a more accurate ambient humidity estimate can be used to for engine adjustments. By unfreezing the humidity sensor output after (e.g., immediately after) a threshold duration since the compressor bypass event has elapsed, engine functions that depend on humidity information are not affected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
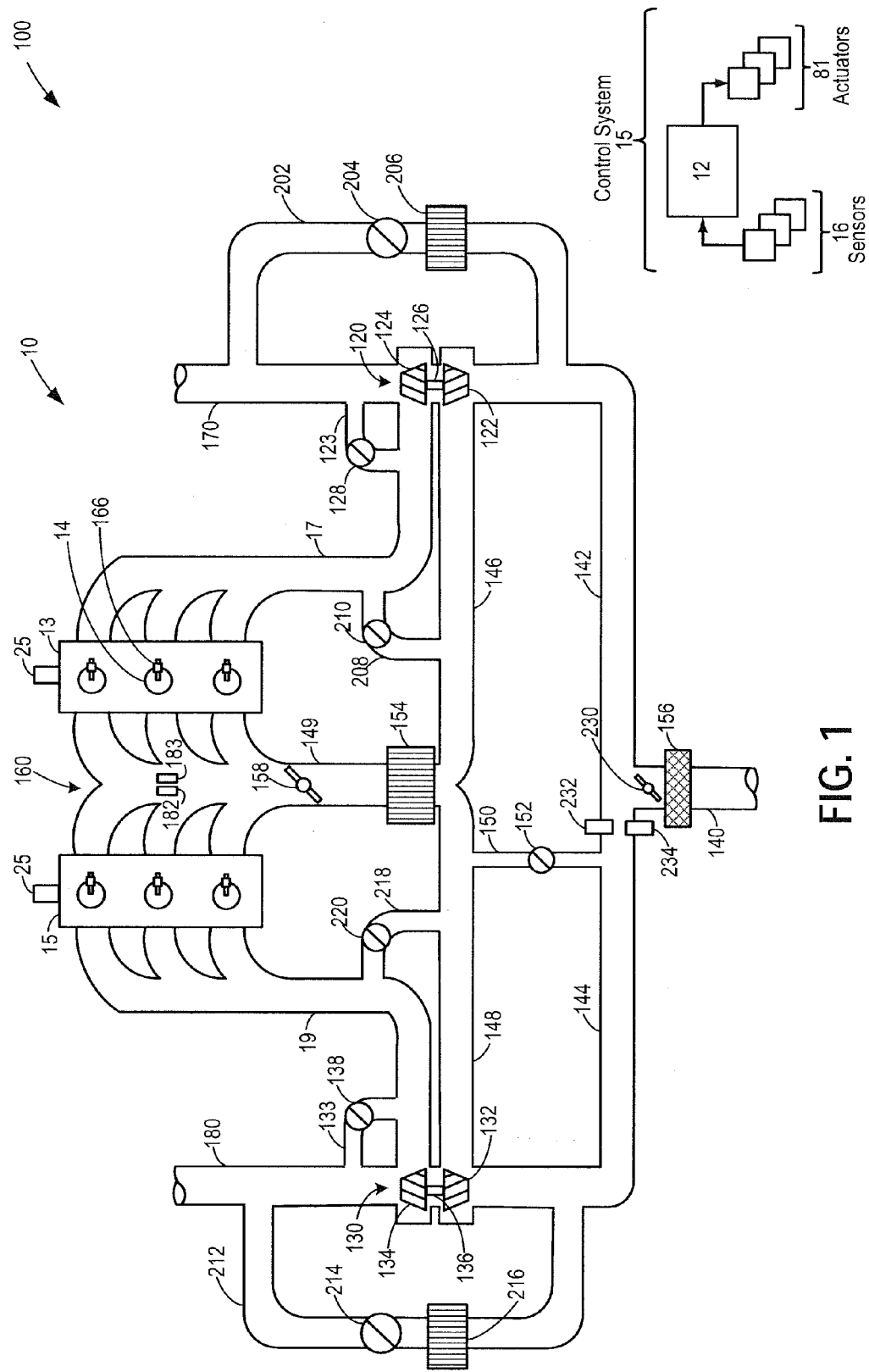
FIG. 1 shows a schematic depiction of an example engine system including an intake humidity sensor.
Figure 2:
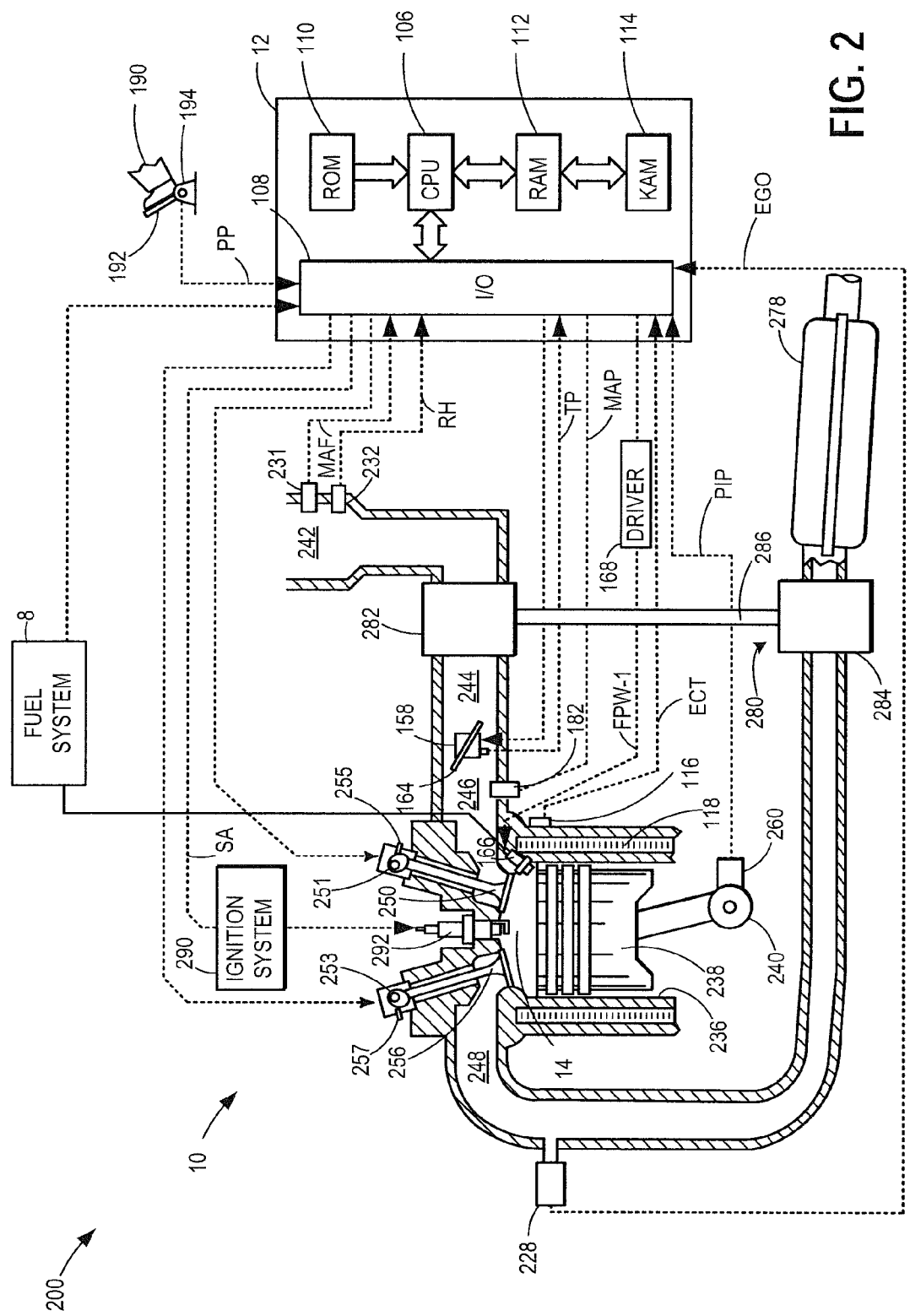
FIG. 2 shows a schematic depiction of a combustion chamber of the engine system of FIG. 1.

The following description relates to systems and methods for using the output of a humidity sensor coupled in an engine system (such as shown in FIGS. 1-2) to adjust on or more engine operating parameters. Based on whether a compressor bypass valve is open or closed, a current or stored output of the sensor is selected for estimating an ambient humidity. An engine controller may be configured to perform a control routine, such as the example routine of FIG. 3, to use the current output of the humidity sensor during conditions when a compressor bypass valve is closed to estimate an ambient humidity. Engine operating parameters may then be adjusted based on the current output based ambient humidity estimate. During conditions when the compressor bypass valve is open, such as when the engine is operating at or near surge, the current output of the humidity may not be used. Instead, an output of the humidity sensor read immediately before the bypass valve is opened may be stored and used to estimate ambient humidity. Engine operating parameters may then be adjusted based on the stored output based ambient humidity estimate. An example adjustment is shown with reference to FIG. 4. In this way, humidity estimation accuracy is increased and engine control is improved.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156 and an EGR throttle valve 230. Engine system 100 may be a split-engine system wherein intake passage 140 is branched downstream of EGR throttle valve 230 into first and second parallel intake passages, each including a turbocharger compressor. Specifically, at least a portion of intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. Similarly, a second portion of the total intake air can be compressed via compressor 132 where it may be supplied to intake manifold 160 via second parallel branched intake passage 148. As shown in FIG. 1, intake air from intake passages 146 and 148 can be recombined via a common intake passage 149 before reaching intake manifold 160, where the intake air may be provided to the engine.

A first EGR throttle valve 230 may be positioned in the engine intake upstream of the first and second parallel intake passages 142 and 144, while a second air intake throttle valve 158 may be positioned in the engine intake downstream of the first and second parallel intake passages 142 and 144, and downstream of the first and second parallel branched intake passages 146 and 148, for example, in common intake passage 149.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include an air cooler 154 and/or a throttle (such as second throttle valve 158). The position of throttle valve 158 can be adjusted by the control system via a throttle actuator (not shown) communicatively coupled to controller 12. A compressor bypass valve (CBV) 152 may be provided to selectively bypass the compressor stages of turbochargers 120 and 130 via compressor bypass passage 150. As one example, CBV 152 can open to enable flow through bypass passage 150 when the intake air pressure upstream of the compressors attains a threshold value. As another example, CBV 152 can be opened in response to a margin to surge being at or beyond a surge margin. As used herein, opening the CBV includes at least partially opening the CBV. In one example, in response to the indication of compressor surge, the CBV is fully opened to substantially immediately relieve surge and improve flow through the compressor. As such, the opening of the CBV may be adjusted based on the indication of surge, the opening increased as a margin to the surge limit decreases.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector. Further details of a single cylinder 14 are described below in FIG. 2.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 15 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices, such as a catalyst, and one or more exhaust gas sensors, as further elaborated in FIG. 2.

Engine 10 may further include one or more exhaust gas recirculation (EGR) passages, or loops, for recirculating at least a portion of exhaust gas from first and second parallel exhaust passages 17 and 19 and/or first and second parallel branched exhaust passages 170 and 180, to first and second parallel intake passages 142 and 144, and/or parallel branched intake passages 146 and 148. These may include high-pressure EGR loops for proving high-pressure EGR (HP-EGR) and low-pressure EGR-loops for providing low-pressure EGR (LP-EGR). In one example, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously.

In the depicted example, engine 10 may include a first low-pressure EGR loop 202 for recirculating at least some exhaust gas from the first branched parallel exhaust passage 170, downstream of the turbine 124, to the first parallel intake passage 142, upstream of the compressor 122. Likewise, the engine may include a second low-pressure EGR loop 212 for recirculating at least some exhaust gas from the second branched parallel exhaust passage 180, downstream of the turbine 134, to the second parallel intake passage 144, upstream of the compressor 132. First and second LP-EGR loops 202 and 212 may include respective LP-EGR valves 204 and 214 for controlling an EGR flow (i.e., an amount of exhaust gas recirculated) through the loops, as well as respective charge air coolers 206 and 216 for lowering a temperature of exhaust gas flowing through the respective EGR loops before recirculation into the engine intake.

Engine 10 may further include a first high-pressure EGR loop 208 for recirculating at least some exhaust gas from the first parallel exhaust passage 17, upstream of the turbine 124, to the first branched parallel intake passage 146, downstream of the compressor 122. Likewise, the engine may include a second high-pressure EGR loop 218 for recirculating at least some exhaust gas from the second parallel exhaust passage 18, upstream of the turbine 134, to the second branched parallel intake passage 148, downstream of the compressor 132. EGR flow through HP-EGR loops 208 and 218 may be controlled via respective HP-EGR valves 210 and 220.

Humidity sensor 232 and pressure sensor 234 may be included in only one of the parallel intake passages (herein, depicted not in the first parallel intake air passage 142 but in the second parallel intake passage 144), downstream of EGR throttle valve 230. Specifically, humidity sensor 232 is located in the intake passage, downstream of the air filter and upstream of the compressor inlet (between air filter 156 and the compressor inlet). However, in alternate examples, humidity sensor 232 may be located at the air filter. Further still, humidity sensor 232 may be located upstream of throttle 158 in intake manifold 160. Humidity sensor 232 may be configured to estimate a relative humidity (or ambient humidity) of the intake air. In one example, humidity sensor 232 may be a dedicated humidity sensor. In another example, humidity sensor 232 may be an intake oxygen sensor that is selectively used for humidity estimation during a first set of conditions, and selectively used for intake oxygen estimation during a second set of conditions. For example, during humidity estimation, an ambient humidity may be estimated by the intake oxygen sensor based on a difference between sensor outputs read while modulating a voltage applied to the oxygen sensor. Pressure sensor 234 may be configured to estimate a pressure of the intake air. In some embodiments, a temperature sensor may also be included in the same parallel intake passage, downstream of the EGR throttle valve 230.

Figure 3:
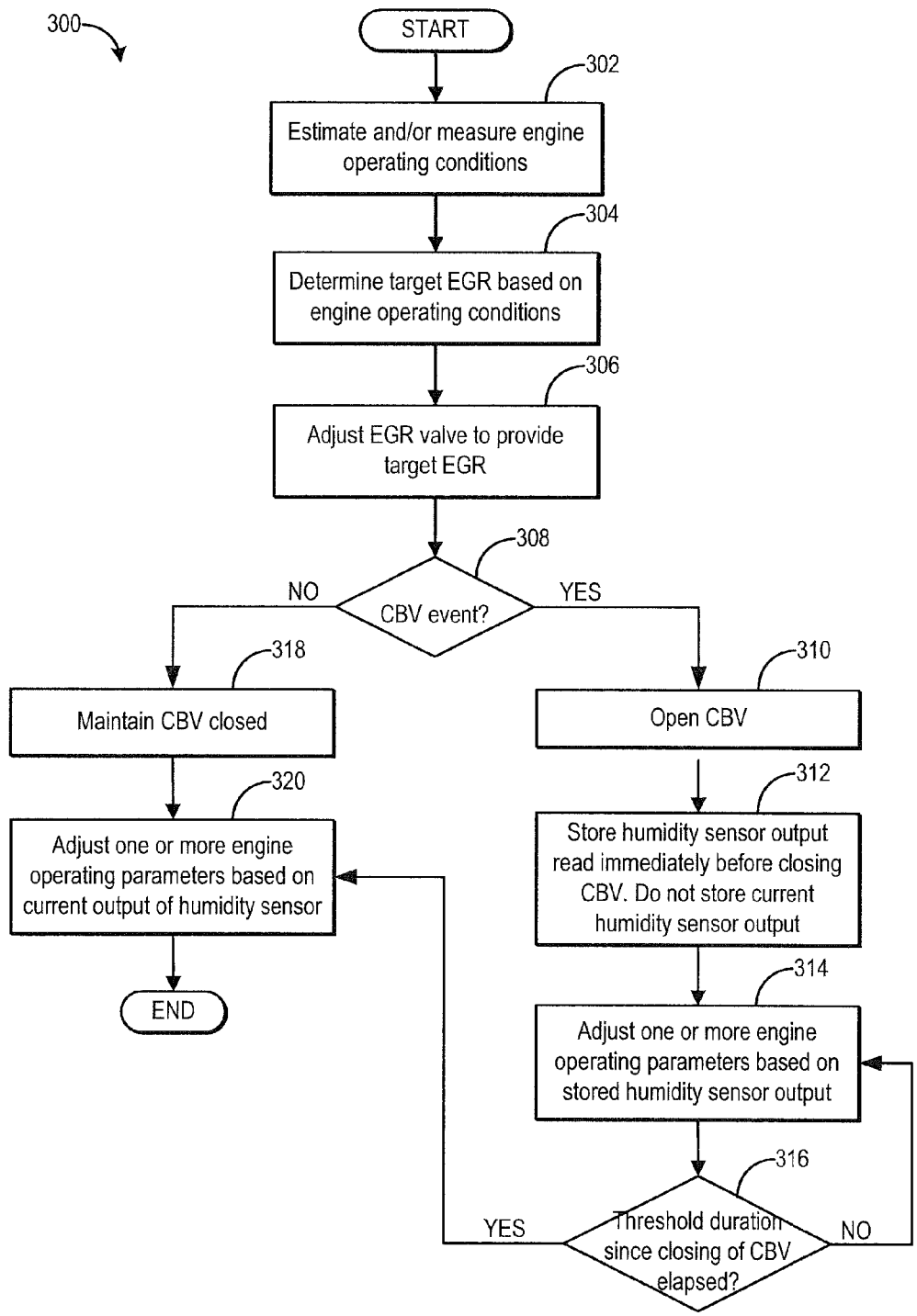
FIG. 3 shows a high level flow chart for adjusting one or more engine operating parameters based on either a current or stored output of the humidity sensor of FIG. 1, in view of a compressor bypass valve event.

As elaborated at FIG. 3, an engine controller may use the current output of humidity sensor 232 to estimate an ambient humidity during conditions when compressor bypass valve 152 is closed. During conditions when the compressor bypass valve is opened, such as during a CBV event responsive to an operator pedal tip-out, the current output of the humidity sensor may be temporarily disregarded. This is because during those conditions, the humidity sensor may provide an incorrect ambient humidity estimate. For example, the ambient humidity may be overestimate due to a temporary back-flow of air from an outlet of the compressor (or charge air cooler) to the compressor inlet causing a transient increase in compressor inlet pressure. The short duration of the increase in compressor inlet pressure can cause the aircharge to back-flow towards the atmosphere, past the air filter and the intake humidity sensor. If low pressure EGR was already running when the CBV is opened, the back-flowing air may have additional water content from the EGR, causing the humidity sensor to overestimate ambient humidity. As an example, the humidity sensor reading from before the CBV event, with 13% EGR running, may be indicative of an ambient humidity of 8 g/kg. In response to the CBV event, the humidity sensor reading may be indicative of an ambient humidity of 8+10=18 g/kg, wherein the 10 g/kg corresponds to the amount of water that comes from 13% EGR with E0 fuel being combusted. As such, the amount of humidity error incurred seen during the CBV may further vary as a function of the ethanol content of the fuel since the ethanol content changes the amount of water vapor in the EGR. The incorrect humidity reading may impact engine functions and parameters that are adjusted based on the ambient humidity estimate, such as spark correction, condensation modelling, EGR, as well as on-board diagnostics (OBD) for the humidity sensor. Thus, during those conditions, the controller may freeze a humidity reading from before the opening of the CBV and use the frozen reading to perform engine control. Then once a sufficient amount of time has passed since the closing of the CBV, the current output of the humidity sensor may be read and used to perform engine control.

Returning to FIG. 1, the position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include humidity sensor 232, intake air pressure sensor 234, MAP sensor 182, and MAT sensor 183. In some examples, common intake passage 149 may include a throttle inlet pressure (TIP) sensor for estimating a throttle inlet pressure (TIP) and/or a throttle inlet temperature sensor for estimating a throttle air temperature (TCT). In other examples, one or more of the EGR passages may include pressure, temperature, and air-to-fuel ratio sensors, for determining EGR flow characteristics. Additional system sensors and actuators are elaborated below with reference to FIG. 2. As another example, actuators 81 may include fuel injector 166, HP-EGR valves 210 and 220, LP-EGR valves 204 and 214, throttle valves 158 and 230, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. An example control routine is described herein with regard to FIG. 3.

FIG. 2 depicts an example embodiment of a cylinder or combustion chamber of internal combustion engine 10. Engine 10 may receive control parameters from controller 12 and input from vehicle operator 190 via an input device 192, such as an accelerator pedal and a pedal position sensor 194 for generating a proportional pedal position signal PP. Cylinder (herein also "combustion chamber') 14 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 10.

Cylinder 14 can receive intake air via a series of intake air passages 242, 244, and 246. Intake air passage 246 can communicate with other cylinders of engine 10 in addition to cylinder 14. In some embodiments, one or more of the intake passages may include a boosting device such as a turbocharger 280. For example, FIG. 2 shows engine 10 configured with a turbocharger including a compressor 282 arranged between intake passages 242 and 244, and an exhaust turbine 284 arranged along exhaust passage 248. Compressor 282 may be at least partially powered by exhaust turbine 284 via a shaft 286 where the boosting device is configured as a turbocharger. A throttle valve 158 including a throttle plate 164 may be provided along an intake passage of the engine for varying the flow rate and/or pressure of intake air provided to the engine cylinders. For example, throttle valve 158 may be disposed downstream of compressor 282 as shown in FIG. 2, or alternatively may be provided upstream of the compressor.

Exhaust passage 248 can receive exhaust gases from other cylinders of engine 10 in addition to cylinder 14. Exhaust gas sensor 228 is shown coupled to exhaust passage 248 upstream of emission control device 278. Sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 228. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 250 and at least one exhaust poppet valve 256 located at an upper region of cylinder 14. In some embodiments, each cylinder of engine 10, including cylinder 14, may include at least two intake poppet valves and at least two exhaust poppet valves located at an upper region of the cylinder. The valves of cylinder 14 may be deactivated via hydraulically actuated lifters coupled to valve pushrods, or via a cam profile switching mechanism in which a cam lobe with no lift is used for deactivated valves. In this example, deactivation of intake valve 250 and exhaust valve 256 may be controlled by cam actuation via respective cam actuation systems 251 and 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. In alternative embodiments, the intake and/or exhaust valve may be controlled by electric valve actuation. In one example, cylinder 14 may include an intake valve controlled via cam actuation including VCT systems and an exhaust valve controlled via electric valve actuation.

In some embodiments, each cylinder of engine 10 may include a spark plug 292 for initiating combustion. Ignition system 290 can provide an ignition spark to combustion chamber 14 via spark plug 292 in response to spark advance signal SA from controller 12, under select operating modes. However, in some embodiments, spark plug 292 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 231; engine coolant temperature (ECT) from temperature sensor 116 coupled to cooling sleeve 118; a profile ignition pickup signal (PIP) from Hall effect sensor 260 (or other type) coupled to crankshaft 240; throttle position (TP) from a throttle position sensor; and absolute manifold air pressure signal (MAP) from sensor 182. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 182 may be used to provide an indication of vacuum, or pressure, in the intake manifold. Further, as noted herein, manifold pressure may be estimated based on other operating parameters, such as based on MAF and RPM, for example.

Engine 10 further includes a humidity sensor 232. The humidity sensor may detect a water vapor concentration of air entering the intake manifold via intake passage 242. As previously elaborated, humidity sensor 232 may be positioned downstream of an EGR throttle valve (230, FIG. 1) but upstream of the intake throttle valve 158. A relative humidity reading generated by the humidity sensor is indicative of the ambient humidity of fresh intake air or a combination of fresh air and recirculated exhaust air, based on the position of EGR throttle valve 230 and the LP-EGR and HP-EGR valves (of FIG. 1).

As described above, FIG. 2 shows only one cylinder of a multi-cylinder engine, and that each cylinder may similarly include its own set of intake/exhaust valves, fuel injector, spark plug, etc.

FIG. 3 illustrates an example routine 300 for adjusting one or more engine operating parameters based on the output of an intake humidity sensor coupled to an intake manifold of the engine, upstream of an intake throttle. The routine allows one of a current sensor output or a frozen sensor output to be selected for estimating an ambient humidity and adjusting engine operating parameters based on whether a compressor bypass valve (CBV) is open or closed. In doing so, humidity estimation errors incurred due to backflow during a CBV event are reduced.

At 302, the routine includes estimating and/or measuring engine operating conditions. These may include, for example, engine speed, driver torque demand, boost pressure, ignition spark timing, air-fuel ratio, engine temperature, exhaust catalyst temperature, etc.

At 304, a target EGR may be determined based on the estimated engine operating conditions. This may include determining an amount, flow rate, and/or temperature of exhaust gas to be recirculated to the engine intake manifold from the exhaust manifold (for example, from parallel exhaust passages to respective parallel intake passages in a split engine system). This may further include determining whether the desired amount of EGR is to be provided as LP-EGR flow, HP-EGR flow, or a combination thereof. At 306, an EGR valve may be adjusted to provide the target EGR. This may include adjusting the opening of one or more of an LP-EGR valve and an HP-EGR valve to provide the desired amount of LP-EGR and HP-EGR, respectively.

At 308, it may be determined if there is a compressor bypass valve event. Specifically, it may be determined if conditions are present that require a compressor bypass valve to be opened (e.g., partially opened or fully opened). As such, the compressor bypass valve (CBV) may be positioned in a compressor bypass passage coupling an outlet of the compressor to the inlet of the compressor. In one example, the opening of the compressor bypass valve is in response to an indication of compressor surge. For example, the compressor may be operating at beyond a surge limit. In another example, the opening of the compressor bypass valve is in response to a boost pressure being higher than a threshold pressure. Therein, at the elevated boost pressure, a margin to compressor surge may be reduced and compressor surge may be likely. As such, during selected conditions, such as during a tip-out, when going from engine operation with higher boost to engine operation without lower boost (or no boost), compressor surge can occur. This is due to a decreased flow through the compressor when the throttle closes at the tip-out. The reduced forward flow through the compressor can cause surge and degrade turbocharger performance. In addition, surge can lead to NVH issues such as undesirable noise from the engine intake system. To reduce compressor surge, at least a portion of the aircharge compressed by the compressor may be recirculated to the compressor inlet by opening the CBV. This allows excess boost pressure to be substantially immediately relieved and forward flow through the compressor to be improved.

At 310, the routine includes opening the compressor bypass valve (CBV) responsive to the CBV event. The inventors have recognized that while opening the CBV allows surge to be reduced and forward flow through the compressor to be improved, an output of the intake humidity sensor may be affected. Specifically, when the CBV is opened, a transient backflow of charge is created. This is due to a short duration of elevated compressor inlet pressure which causes backflow of air towards the atmosphere, past the intake humidity sensor and the air filter. If EGR is already enabled when the CBV is opened, the back-flowing air may include additional water from the exhaust residuals. As a result, the current output of the humidity sensor, as well as the ambient humidity estimated by the sensor based on the current output, may be higher than an actual ambient humidity. Engine control performed based on the incorrect elevated ambient humidity estimate may adversely affect engine performance.

Therefore, at 312, in response to opening of the compressor bypass valve while EGR is enabled, the routine includes storing an output of the humidity sensor read before the CBV is opened in the controller's memory. The output stored before the CBV opening may be an output stored immediately before the opening of the CBV, without any engine shutdowns and EGR valve closings there-between. In other words, the sensor output from immediately before the CBV opening may be frozen. In addition, the current output of the humidity sensor may be disregarded and not stored. Optionally, an ambient humidity estimate, based on the output of the humidity sensor read before the CBV is opened, may also be stored and frozen in the controller's memory.

At 314, the routine further includes adjusting an engine operating parameter based on the output of the intake humidity sensor read before the opening of the bypass valve. In one example, this includes adjusting based on an output of the sensor read (and frozen) immediately before the opening of the bypass valve, and independent of the current output of the humidity sensor. As such, various engine operating parameters and functions may be adjusted based on the ambient humidity estimate. These may include, for example, spark timing, spark correction, EGR, condensation modelling (e.g., where an amount of condensation accumulating at the charge air cooler is estimated), humidity sensor diagnostics, etc.

At 316, it may be determined if the CBV event has been completed (that is, the CBV has been closed) and a threshold duration has elapsed since the closing of the CBV. In one example, the threshold duration is 2 to 3 seconds. For example, if the compressor outlet pressure has reduced sufficiently (following the opening of the CBV) and the margin to compressor surge has improved, then the CBV may be closed. As such, following a threshold duration since the completion of the CBV event, the (current) output of the humidity sensor may have stabilized and may be representative of a more accurate ambient humidity reading.

If the CBV has not closed or the threshold duration since the CBV closing has not elapsed, then the routine returns to 314 and continues to adjust the engine operating parameter based on the output of the sensor read immediately before the opening of the bypass valve until the threshold duration since the closing of the compressor bypass valve has elapsed.

In comparison, after either the threshold duration since opening the compressor bypass valve has elapsed or the compressor bypass valve is closed, at 320 the routine includes adjusting the engine operating parameter based on the current output of the humidity sensor. As used herein, the engine operating parameter includes one or more of an EGR estimate, intake aircharge estimate, fuel alcohol content estimate, spark timing, spark correction, thresholds used for humidity sensor diagnostics, and condensation modeling coefficients.

Returning to 308, if a CBV event is not confirmed, the routine moves to 318 to maintain the CBV closed. The routine then moves to 320 to adjust the engine operating parameter based on the current output of the humidity sensor, and the current estimate of ambient humidity. One example adjustment of EGR based on the output of the humidity sensor is shown with reference to the example of FIG. 4.

In one example, during a first boosted engine operation, the engine controller is configured to close a compressor bypass valve while EGR is enabled, and adjust an engine operating parameter based on a current output of an intake humidity sensor. In comparison, during a second boosted engine operation, the controller is configured to open the compressor bypass valve while EGR is enabled, and adjust an engine operating parameter based on an output of the humidity sensor read before the opening (e.g., immediately before the opening) of the bypass valve. Herein, during the second boosted engine operation, the controller does not adjust the engine operating parameter based on the current output of the humidity sensor. Further, during the second boosted engine operation, after a threshold duration since a closing of the compressor bypass valve has elapsed, the controller adjusts the engine operating parameter based on the current output of the humidity sensor. The engine operating parameter includes one or more of EGR valve opening (e.g., degree of opening), spark ignition timing, fuel injection timing, coefficients and functions for engine condensation models, coefficients and functions for spark correction models, and thresholds for sensor diagnostics (such as humidity sensor diagnostics). In one example, the closing of the compressor bypass valve during the first boosted operation is in response to a margin to surge being higher than a threshold, while the opening of the compressor bypass valve during the second boosted operation is in response to the margin to surge being lower than the threshold.

In another example, an engine system comprises an engine, a compressor coupled to an intake manifold of the engine, and a bypass passage coupled between an outlet and an inlet of the compressor, the compressor driven by a turbine, the bypass including a bypass valve. The engine system further comprises a humidity sensor coupled to the intake manifold, upstream of an intake throttle, and an EGR passage for recirculating exhaust residuals from an exhaust manifold of the engine, downstream of the turbine, to the intake manifold, upstream of the compressor, via an EGR valve. The engine system further includes a controller with computer readable instructions for, while EGR is enabled, and in response to an indication of compressor surge, opening the bypass valve, and storing an output of the humidity sensor read immediately before the opening of the bypass valve. The opening of the bypass valve may be based on the indication of surge, the bypass valve opening increased as a margin to surge decreases. The controller may then adjust EGR flow based on the stored sensor output. The controller may include further instructions for, while the bypass valve is open, not storing a current output of the humidity sensor. In other words, the current output of the humidity sensor may be disregarded while the output of the humidity sensor read before the CBV is opened may be frozen and used until conditions enabling use of the current humidity sensor output are restored. As used herein, EGR being enabled includes the EGR valve being at least partially open. Herein, the EGR valve may be a low pressure EGR valve coupled in a low pressure EGR system. The controller may include further instructions for, closing the bypass valve in response to an increase in the margin to surge and after a threshold duration has elapsed following the closing of the bypass valve, storing the current output of the humidity sensor, and adjusting EGR flow based on the current humidity sensor output. In other words, the current output of the humidity sensor may be restored following conditions where backflow to the compressor inlet are reduced.

Figure 4:
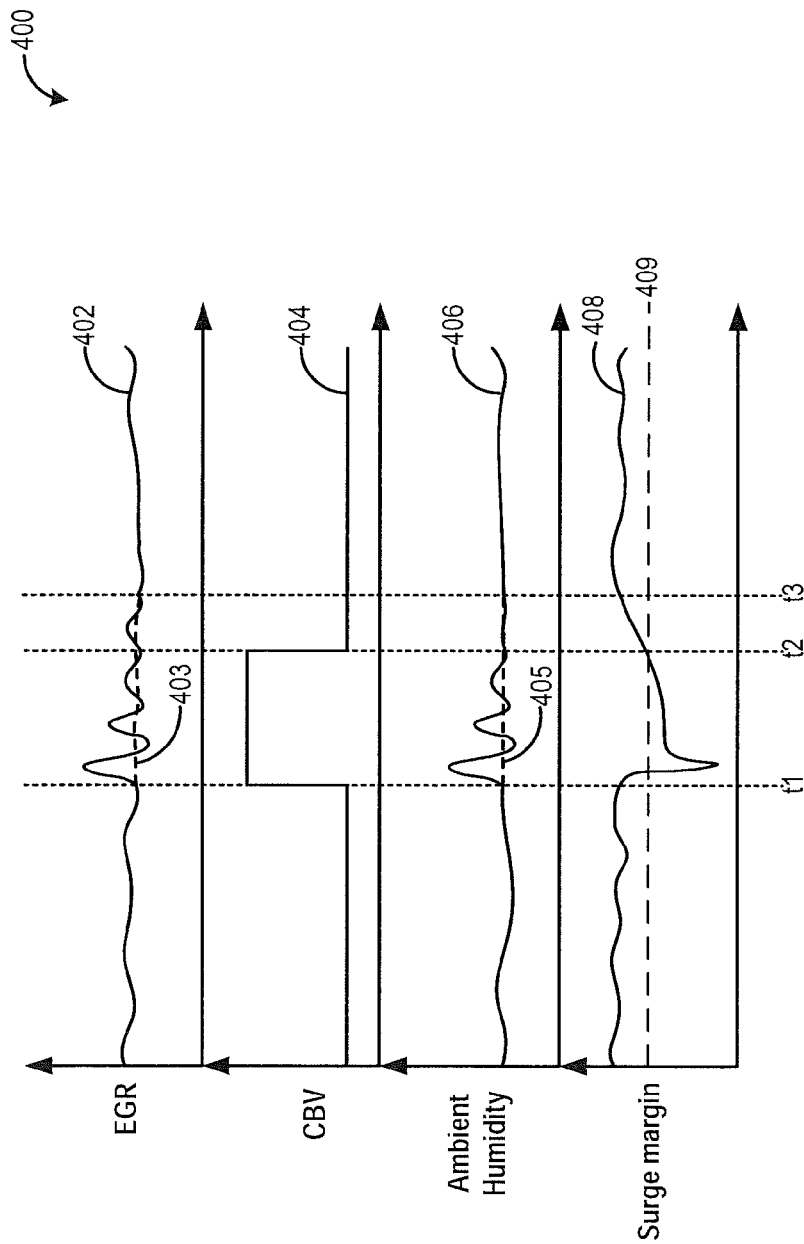
FIG. 4 shows an example EGR adjustment based on the output of an intake humidity sensor, according to the present disclosure.

Now turning to FIG. 4, an example adjustment of engine operating parameters (specifically EGR) responsive to the output of an intake humidity sensor is shown. Specifically, map 400 depicts changes in EGR estimation at plot 402, a position (open or closed) of a compressor bypass valve (CBV) at plot 404, ambient humidity estimate based on the output of an intake humidity sensor at plot 406, and a margin to compressor surge at plot 408.

Prior to t1, the engine may be operating boosted with low pressure EGR enabled (plot 402). In addition, the boost pressure may be within a threshold such that the compressor ratio is sufficiently outside a surge limit 409, and therefore the CBV is closed (plot 404). During such conditions, the ambient humidity may be estimated based on a current output (plot 406) of the humidity sensor.

At t1, there may be sudden change in compressor ratio and the margin to surge may drop such that the compressor ratio is temporarily beyond surge limit 409. In one example, the change in compressor ratio at t1 may be due to a sudden operator pedal tip-out event. In response to the compressor ratio moving beyond surge limit 409, at t1, the CBV may be opened (herein fully opened) to substantially immediately provide pressure relief. Specifically, the CBV may be opened so that a portion of boost pressure can be recirculated from downstream of the compressor (e.g., downstream of a charge air cooler) to upstream of the compressor (e.g., to the compressor inlet). This allows the boost pressure at the compressor outlet to be rapidly reduced and forward flow through the compressor to be improved, improving the compressor ratio. In particular, the compressor ratio may move out of a hard surge region and may transiently move into a soft surge region until the boost pressure is sufficiently reduced to remove all indication of surge.

Between t1 and t2, while the CBV is open, the current output of the humidity sensor may be incorrect and erratic. Specifically, due to back-flowing air and EGR, as well as pressure variations at the compressor inlet, near the humidity sensor, the current output of the sensor may be indicative of a higher ambient humidity estimate than actually present. If EGR were estimated or adjusted based on the incorrect humidity sensor output, the EGR control may also be incorrect and erratic (plot 402).

To reduce errors in humidity estimation and EGR control, between t1 and t2, while the CBV is closed, the current output of the humidity sensor is disregarded. Instead, an output of the humidity sensor read immediately before the opening of the CBV (just before t1) may be stored and used to estimate ambient humidity between t1 and t2 (see dashed line 405). Likewise, between t1 and t2, EGR control is performed independent of the current humidity sensor output and based on the frozen output of the humidity sensor (that is, based on dashed line 405), as shown at dashed line 403.

At t2, the boost pressure may have sufficiently reduced and the compressor ratio may be once again outside the surge limit. Accordingly, at t2, the CBV may be closed. Humidity estimation and EGR control based on the frozen sensor output may be continued for a duration (duration between t2 and t3) after the closing of the CBV to allow for compressor inlet conditions, and humidity sensor output, to stabilize. Then, following t3, the current output of the humidity sensor may once again be read and used for EGR control.

In this way, during a CBV event occurring while EGR is flowing, the output of an intake humidity sensor may not be used for estimating ambient humidity and adjusting engine operating parameters. By relying instead on an output of the sensor read before the CBV is opened, humidity estimation errors (such as humidity over-estimation) due to backflow of charge (containing additional water from exhaust residuals) at the compressor inlet is reduced. By using the more reliable ambient humidity estimate to adjust engine operating parameters, engine control is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
in response to opening of a compressor bypass valve while EGR is enabled,
adjusting an engine operating parameter based on an output of an intake humidity sensor read before the opening of the bypass valve;
wherein adjusting based on an output of the sensor read before the opening includes adjusting based on an output of the sensor read immediately before the opening of the bypass valve; and
continuing to adjust the engine operating parameter based on the output of the sensor read immediately before the opening of the bypass valve until the compressor bypass valve is closed and a threshold duration since the closing of the compressor bypass valve has elapsed.

2. The method of claim 1, wherein the adjusting based on the output of the intake humidity sensor read before the opening of the bypass valve includes adjusting independent of a current output of the humidity sensor, wherein the output read before the opening is an output read immediately before the opening without any engine shutdowns and EGR valve closings, there-between.

3. The method of claim 1, wherein the opening of the compressor bypass valve is in response to an indication of compressor surge.

4. The method of claim 1, wherein the opening of the compressor bypass valve is in response to a boost pressure being higher than a threshold pressure.

5. The method of claim 1, wherein the intake humidity sensor is located in an intake passage, downstream of an air filter and upstream of a compressor inlet.

6. The method of claim 1, further comprising, after the duration since closing of the compressor bypass valve has elapsed, adjusting the engine operating parameter based on the current output of the humidity sensor.

7. The method of claim 1, wherein the engine operating parameter includes one or more of an EGR estimate, an intake aircharge estimate, a fuel alcohol content estimate, spark timing, condensation modelling coefficient, spark correction coefficient, and threshold for humidity sensor diagnostics.

8. The method of claim 1, wherein the intake humidity sensor is an intake oxygen sensor, and wherein an ambient humidity is estimated by the intake oxygen sensor based on a difference between sensor outputs read while modulating a voltage applied to the oxygen sensor.

9. A method for an engine, comprising:
during a first boosted engine operation, closing a compressor bypass valve while EGR is enabled, and adjusting an engine operating parameter based on a current output of an intake humidity sensor;
during a second boosted engine operation, opening the compressor bypass valve while EGR is enabled, and adjusting an engine operating parameter based on an output of the humidity sensor read before the opening of the bypass valve; and
during the second boosted engine operation, not adjusting the engine operating parameter based on the current output of the humidity sensor.

10. The method of claim 9, wherein the engine operating parameter includes one or more of EGR valve opening, spark ignition timing, and fuel injection timing.

11. The method of claim 10, further comprising, during the second boosted engine operation, after opening the compressor bypass valve, closing the bypass valve, and after a threshold duration since the closing of the compressor bypass valve has elapsed, adjusting the engine operating parameter based on the current output of the humidity sensor.

12. The method of claim 9, wherein closing the compressor bypass valve during the first boosted operation is in response to a margin to surge being higher than a threshold, and wherein opening the compressor bypass valve during the second boosted operation is in response to the margin to surge being lower than the threshold.

13. An engine system, comprising:
an engine;
a compressor coupled to an intake manifold of the engine, the compressor driven by a turbine;
a bypass passage coupled between an outlet and an inlet of the compressor, the bypass including a bypass valve;
a humidity sensor coupled to the intake manifold, upstream of an intake throttle;
a low pressure EGR passage for recirculating exhaust residuals from an exhaust manifold of the engine, downstream of the turbine, to the intake manifold, upstream of the compressor, via an EGR valve; and
a controller with computer readable instructions for:
while EGR is enabled, in response to an indication of compressor surge, opening the bypass valve;
storing an output of the humidity sensor read immediately before the opening of the bypass valve;
adjusting EGR flow based on the stored sensor output; and
while the bypass valve is open, not storing a current output of the humidity sensor.

14. The system of claim 13, wherein EGR being enabled includes the EGR valve being at least partially open.

15. The system of claim 14, wherein the opening of the bypass valve is based on the indication of surge, the bypass valve opening increased as a margin to surge decreases.

16. The system of claim 15, wherein the controller includes further instructions for, closing the bypass valve in response to an increase in the margin to surge, and after a threshold duration since the closing of the bypass valve has elapsed, storing the current output of the humidity sensor, and adjusting EGR flow based on the current humidity sensor output.

* * * * *